United States Patent
Hayashi et al.

(10) Patent No.: US 12,276,979 B2
(45) Date of Patent: Apr. 15, 2025

(54) MAP MANAGEMENT SYSTEM AND MAP MANAGEMENT METHOD

(71) Applicant: TOYOTA JIDOSHA KABUSHIKI KAISHA, Toyota (JP)

(72) Inventors: Yusuke Hayashi, Susono (JP); Taichi Kawanai, Susono (JP); Daichi Hotta, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 17/991,600

(22) Filed: Nov. 21, 2022

(65) Prior Publication Data
US 2023/0229160 A1    Jul. 20, 2023

(30) Foreign Application Priority Data
Jan. 18, 2022    (JP) ................. 2022-005898

(51) Int. Cl.
G05D 1/00    (2024.01)
B60W 60/00    (2020.01)
G01C 21/00    (2006.01)

(52) U.S. Cl.
CPC ........ *G05D 1/0044* (2013.01); *B60W 60/0059* (2020.02); *G01C 21/3811* (2020.08); *G01C 21/3837* (2020.08); *G01C 21/3889* (2020.08); *B60W 2554/20* (2020.02); *B60W 2554/80* (2020.02); *B60W 2756/10* (2020.02)

(58) Field of Classification Search
CPC ........ B60W 2554/20; B60W 2554/80; B60W 2756/10; B60W 60/0059; G01C 21/3811; G01C 21/3837; G01C 21/3889; G05D 1/0038; G05D 1/0044; G05D 1/0274
See application file for complete search history.

(56) References Cited

U.S. PATENT DOCUMENTS 9,008,890 B1 *    4/2015    Herbach ............. G05D 1/0297
                                                340/436
9,274,525 B1 *    3/2016    Ferguson ............. B60W 10/18
(Continued)

FOREIGN PATENT DOCUMENTS

JP    2019-185280 A    10/2019
JP    2020-071053 A    5/2020
(Continued)

*Primary Examiner* — Babar Sarwar
(74) *Attorney, Agent, or Firm* — Sughrue Mion, PLLC

(57) ABSTRACT

A map management system stores map information used by an automated driving vehicle. The automated driving vehicle detects an obstacle based on the map information, or acquires a margin distance when stopping in front of an obstacle based on the map information. When requiring a remote operator's decision about an action with respect to the obstacle, the automated driving vehicle issues a support request that requests the remote operator to give support. The map management system acquires an operator instruction to the automated driving vehicle issued by the remote operator in response to the support request. The map management system estimates a type of the obstacle based on a state of acquisition of the operator instruction or a content of the operator instruction. Then, the map management system updates the map information according to the type of the obstacle.

9 Claims, 17 Drawing Sheets

(56) References Cited

U.S. PATENT DOCUMENTS

| | | | | |
|---|---|---|---|---|
| 11,610,479 | B1* | 3/2023 | Hansen | G08G 1/08 |
| 11,763,668 | B2* | 9/2023 | Ghafarianzadeh | G06V 20/58 |
| | | | | 706/12 |
| 11,768,493 | B2* | 9/2023 | Caldwell | G06F 9/451 |
| | | | | 701/27 |
| 11,919,540 | B2* | 3/2024 | Hayashi | G08G 1/096822 |
| 12,090,997 | B1* | 9/2024 | Ferguson | B60W 30/0953 |
| 12,106,583 | B2* | 10/2024 | Potnis | G06V 20/588 |
| 2017/0122749 | A1* | 5/2017 | Urano | G01S 19/42 |
| 2018/0056992 | A1* | 3/2018 | Sogen | G05D 1/0276 |
| 2018/0292833 | A1* | 10/2018 | You | G05D 1/0274 |
| 2019/0368882 | A1* | 12/2019 | Wheeler | G01C 21/3635 |
| 2020/0133303 | A1* | 4/2020 | Sakaguchi | G01C 21/3896 |
| 2022/0081005 | A1* | 3/2022 | Brown | G08G 1/162 |
| 2022/0308578 | A1* | 9/2022 | Yamazato | G05D 1/0027 |

FOREIGN PATENT DOCUMENTS

| | | |
|---|---|---|
| JP | 2020-166665 A | 10/2020 |
| JP | 2021-064147 A | 4/2021 |

\* cited by examiner

1: AUTOMATED DRIVING MANAGEMENT SYSTEM

<TERRAIN MAP INFORMATION MAP_TE>

| POSITION [X,Y] | HEIGHT Z | EVALUATION INFO. | EVALUATION VALUE | TIME STAMP |
|---|---|---|---|---|

*FIG. 4*

2: REMOTE SUPPORT SYSTEM

MAP MANAGEMENT SYSTEM AND MAP MANAGEMENT METHOD

CROSS-REFERENCE TO RELATED APPLICATION

This application claims priority to Japanese Patent Application No. 2022-005898 filed on Jan. 18, 2022, the entire contents of which are incorporated by reference herein.

BACKGROUND

Technical Field

The present disclosure relates to a technique for managing map information used by an automated driving vehicle.

Background Art

Patent Literature 1 discloses a technique for sharing map information used for automated driving control of a vehicle. An in-vehicle device determines whether or not a takeover that is a transition from the automated driving control to manual driving occurs. When the takeover occurs, the in-vehicle device sets an upload target range including a position where the takeover occurs. Then, the in-vehicle device uploads the map information regarding the upload target range to an external device. The external device updates the map information on the side of the external device based on the map information uploaded from the in-vehicle device.

Patent Literature 2, Patent Literature 3, and Patent Literature 4 disclose technologies related to remote operation of a vehicle.

LIST OF RELATED ART

Patent Literature

Patent Literature 1: Japanese Patent Application Laid-Open No. JP-2020-071053
Patent Literature 2: Japanese Patent Application Laid-Open No. JP-2020-166665
Patent Literature 3: Japanese Patent Application Laid-Open No. JP-2019-185280
Patent Literature 4: Japanese Patent Application Laid-Open No. JP-2021-064147

SUMMARY

Map information used by an automated driving vehicle for detecting an obstacle is considered. If there is a gap between the map information and an actual situation, accuracy of detection of the obstacle may decrease. A technique capable of recognizing the gap between the map information and the actual situation and updating the map information is desired.

An object of the present disclosure is to provide a technique that can efficiently update map information used by an automated driving vehicle.

A first aspect is directed to a map management system.
The map management system includes:
one or more processors; and
one or more memory devices configured to store map information used by an automated driving vehicle.

The automated driving vehicle detects an obstacle based on the map information, or acquires a margin distance when stopping in front of an obstacle based on the map information.

When requiring a remote operator's decision about an action with respect to the obstacle, the automated driving vehicle issues a support request that requests the remote operator to give support.

The one or more processors acquire an operator instruction to the automated driving vehicle issued by the remote operator in response to the support request.

The one or more processors estimate a type of the obstacle based on a state of acquisition of the operator instruction or a content of the operator instruction.

Then, the one or more processors update the map information according to the type of the obstacle.

A second aspect is directed to a map management method for managing map information used by an automated driving vehicle.

The automated driving vehicle detects an obstacle based on the map information, or acquires a margin distance when stopping in front of an obstacle based on the map information.

When requiring a remote operator's decision about an action with respect to the obstacle, the automated driving vehicle issues a support request that requests the remote operator to give support.

The map management method includes:
acquiring an operator instruction to the automated driving vehicle issued by the remote operator in response to the support request;
estimating a type of the obstacle based on a state of acquisition of the operator instruction or a content of the operator instruction; and
updating the map information according to the type of the obstacle.

According to the present disclosure, the map information used by the automated driving vehicle is updated with reference to a content of the remote support related to the obstacle detected by the automated driving vehicle. The operator instruction from the remote operator is likely to vary depending on a type of the obstacle. Therefore, the type of the obstacle detected by the automated driving vehicle can be estimated based on the operator instruction from the remote operator. Then, the map information is updated according to the estimated type of the obstacle.

The remote operator does not need to judge or recognize a gap between the map information and the actual situation. The remote operator just needs to perform the remote support for the automated driving vehicle as usual. The map management system automatically recognizes the gap between the map information and the actual situation based on the operator instruction and automatically updates the map information as necessary. That is, according to the present disclosure, it is possible to efficiently update the map information without increasing a burden on the remote operator.

BRIEF DESCRIPTION OF DRAWINGS

FIG. 4 is a conceptual diagram for explaining an example of terrain map information according to an embodiment of the present disclosure;

EMBODIMENTS

Embodiments of the present disclosure will be described with reference to the accompanying drawings.

1. Automatic Driving Management System 1-1. Configuration Example

Figure 1:
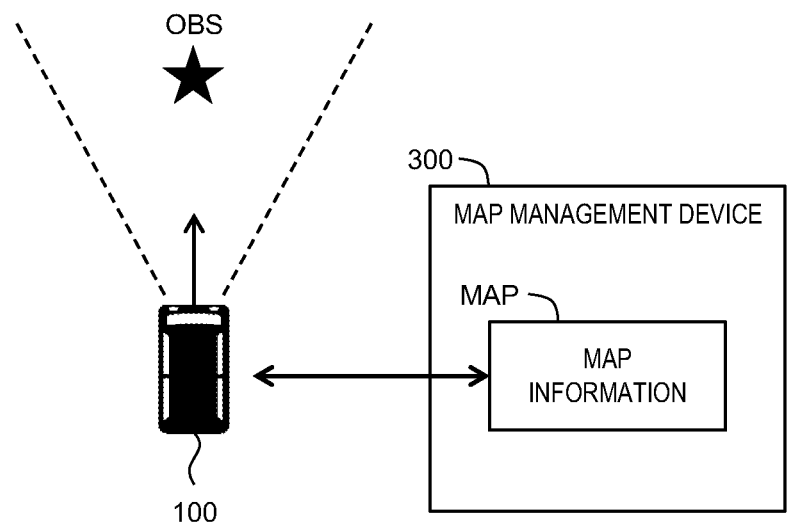
FIG. 1 is a conceptual diagram showing an overview of an automated driving management system according to an embodiment of the present disclosure.

FIG. 1 is a conceptual diagram showing an overview of an automated driving management system 1 according to the present embodiment. The automated driving management system 1 includes an automated driving vehicle 100 and a map management device 300.

The automated driving vehicle 100 is a vehicle capable of automated driving. The automated driving supposed here is one where a driver may not necessarily 100% concentrate on the driving (e.g., so-called Level 3 or higher level automated driving). The automated driving level may be Level 4 or higher that does not need a driver. A recognition sensor such as a camera, a LIDAR (Laser Imaging Detection and Ranging), and a radar is installed on the automated driving vehicle 100. The recognition sensor recognizes a situation around the automated driving vehicle 100. The automated driving vehicle 100 executes automated driving control based on a result of recognition by the recognition sensor.

The automated driving vehicle 100 executes the automated driving control by the use of map information MAP. The map management device 300 manages the map information MAP used by the automated driving vehicle 100. Managing the map information MAP includes distributing the map information MAP to each automated driving vehicle 100, updating the map information MAP, and the like.

For example, the map management device 300 is a management sever on a cloud. The management server may be configured by a plurality of servers that perform distributed processing. The automated driving vehicle 100 communicates with the map management device 300. Then, the automated driving vehicle 100 acquires necessary map information MAP from the map management device 300. In addition, the automated driving vehicle 100 may transmit the result of recognition by the recognition sensor and the like to the map management device 300. The map management device 300 can update the map information MAP based on information provided from the automated driving vehicle 100.

As another example, the map management device 300 may be installed on the automated driving vehicle 100. In this case, the automated driving vehicle 100 itself manages the map information MAP, and updates the map information MAP as necessary.

The map information MAP includes not only general road map and navigation map but also map information from various points of view. For example, the map information MAP includes one used by the automated driving vehicle 100 for detecting an obstacle.

1-2. Background Map Information

For example, the map information MAP includes "background map information MAP_BG." The background map information MAP_BG is map information regarding a stationary object and indicates a position of the stationary object. In other words, the background map information MAP_BG indicates whether or not there is any stationary object for each position. Examples of stationary object include a road structure (e.g., wall, guardrail), grass, a tree, and the like.

Figure 2:
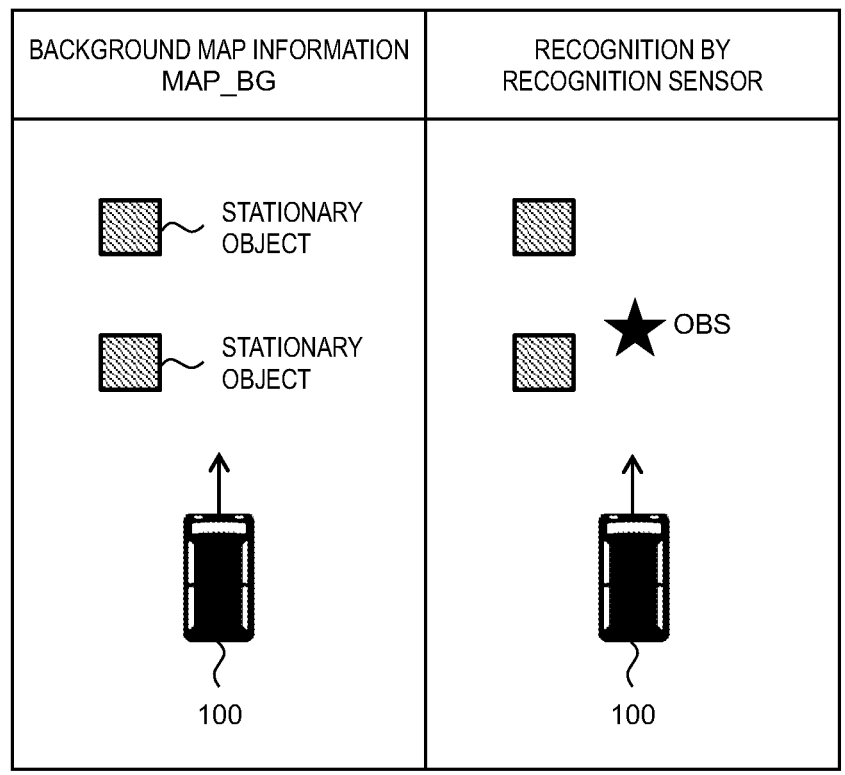
FIG. 2 is a conceptual diagram for explaining obstacle detection based on background map information according to an embodiment of the present disclosure.

FIG. 2 is a conceptual diagram for explaining obstacle detection based on the background map information MAP_BG. The position of the stationary object is registered in the background map information MAP_BG. The automated driving vehicle 100 detects an obstacle OBS around the automated driving vehicle 100 based on a comparison between the background map information MAP_BG and the result of recognition by the recognition sensor. More specifically, the automated driving vehicle 100 acquires the position of the stationary object around the automated driving vehicle 100 based on the background map information MAP_BG and vehicle position information. In addition, the automated driving vehicle 100 acquires a position of an object around the automated driving vehicle 100 based on the result of recognition by the recognition sensor. The automated driving vehicle 100 is able to extract an obstacle OBS around the automated driving vehicle 100 by removing (thinning out) the stationary object from the recognized object. In other words, the automated driving vehicle 100 uses the stationary object indicated by the background map information MAP_BG as a mask, and detects a recognized object not overlapping the mask as the obstacle OBS. Examples of the obstacle OBS include a moving object (e.g., a pedestrian, a bicycle, another vehicle, and the like), a fallen object, and the like.

Figure 3:
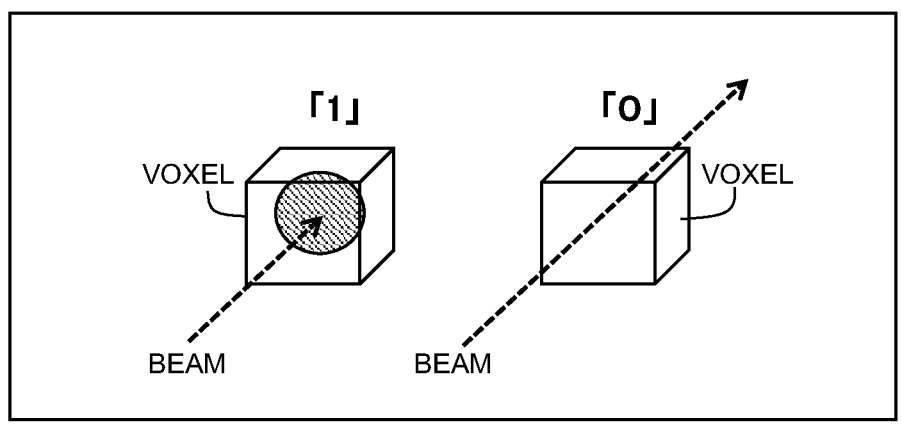
FIG. 3 is a conceptual diagram for explaining an example of background map information according to an embodiment of the present disclosure.

FIG. 3 is a conceptual diagram for explaining an example of the background map information MAP_BG. A LIDAR installed on the automated driving vehicle 100 outputs laser beams to a plurality of directions in sequence (i.e. scanning). It is possible to calculate distances and directions of reflection points based on a reflection state of the laser beams. A LIDAR point cloud is a group of measurement points (i.e. the reflection points) measured by the LIDAR.

Space surrounding the automated driving vehicle 100 is divided into a large number of voxels V. When at least one laser beam is reflected at a certain voxel $V_i$, a measurement result value $M_i$ regarding the voxel $V_i$ is set to "1." When all laser beams entering into a certain voxel $V_i$ pass through without being reflected, the measurement result value $M_i$ regarding the voxel $V_i$ is set to "0." The measurement result value $M_i$ being "1" means that some kind of object exists in the voxel $V_i$. On the other hand, the measurement result value $M_i$ being "0" means that no object exists in the voxel $V_i$.

The LIDAR performs the laser beam scanning repeatedly in terms of time. Accordingly, a plurality of measurement result values $M_i$ that are successive in terms of time are obtained with regard to the same voxel $V_i$. An "occupancy $R_i$" regarding the voxel $V_i$ is defined by an average value of the plurality of measurement result values $M_i$. Every time the automated driving vehicle 100 passes a same road, the measurement result value $M_i$ regarding the voxel $V_i$ is newly obtained and the occupancy $R_i$ is calculated again. That is, the occupancy $R_i$ is updated.

The occupancy $R_i$ being "1" means that an object always exists in the voxel V The object always existing is highly likely to be an stationary object. That is to say, the occupancy $R_i$ being "1" means that there is a strong probability that a stationary object exists in the voxel $V_i$. While on the other hand, the occupancy $R_i$ being "0" means that there is a strong probability that no stationary object exists in the voxel $V_i$. The occupancy $R_i$ being around 0.5 means that it is not certain (clear) whether or not any object exists in the voxel $V_i$.

Information that "there is a strong probability that a stationary object exists" is useful. For example, such the information is used for removing the stationary object from the LIDAR point cloud to detect a moving object such as a pedestrian. Information that "there is a strong probability that no stationary object exists" also is useful. The reason is that when an object is detected in free space where no stationary object exists, the detected object can be regarded as a moving object. In this manner, the background map information MAP_BG can be utilized for detecting a moving object.

An example of a data structure of the background map information MAP_BG also is shown in FIG. 3. One data set is created for each voxel $V_i$. In the example shown in FIG. 3, the data set includes a position (absolute position) [X, Y, Z] of the voxel $V_i$, the occupancy $R_i$, evaluation information, an evaluation value, and a time stamp.

The evaluation value indicates "certainty" of the background map information MAP_BG. That is, the evaluation value indicates certainty that a stationary object exists at the position [X, Y, Z] indicated by the background map information MAP_BG. The certainty can be reworded as accuracy or reliability. The evaluation value can be reworded as a score.

The evaluation information is information used for calculating the evaluation value. The evaluation information includes the number of measurements N. When the number of measurements N is small, the evaluation value is low. As the number of measurements N becomes larger, the evaluation value becomes higher. The evaluation information may include variance of positions of the measurement points (i.e. the reflection points) included in the voxel $V_i$. As the variance becomes larger, the evaluation value becomes lower.

Based on the result of recognition by the recognition sensor of the automated driving vehicle 100, the map management device 300 is able to calculate the occupancy $R_i$ and the evaluation value to generate and update the background map information MAP_BG. The time stamp indicates a time when the data set is generated or a time when the data set is last updated.

When using the background map information MAP_BG, the automated driving vehicle 100 may use only the data set whose evaluation value is equal to or higher than a threshold. In other words, the automated driving vehicle 100 may presume that a stationary object is present at a position indicated by the data set whose evaluation value is equal to or higher than the threshold. Accordingly, accuracy of detection of the obstacle OBS is improved.

1-3. Terrain Map Information

The map information MAP may include "terrain map information MAP_TE." The terrain map information MAP_TE is map information regarding terrain and indicates a height (altitude) Z of a road surface at a position [X, Y]. The obstacle OBS around the automated driving vehicle 100 can also be detected by using the terrain map information MAP_TE. For example, the obstacle OBS on the road surface can be detected by removing the road surface from the LIDAR point cloud.

FIG. 4 is a conceptual diagram for explaining an example of the terrain map information MAP_TE. One data set is created for each position [X, Y]. In the example shown in FIG. 4, the data set includes each position [X, Y], the height Z, evaluation information, an evaluation value, and a time stamp.

For example, the LIDAR is used for calculating the height Z of the road surface at the position [X, Y]. More specifically, a road surface point cloud representing the road surface is extracted from the LIDAR point cloud. Further, the road surface point cloud included in a certain area in the vicinity of the position [X, Y] is extracted. Then, the height Z of the road surface at the position [X, Y] is calculated by interpolating respective heights $ZL_j$ of the extracted road surface points. For example, an average value of the heights $ZL_j$ of the extracted road surface points is calculated as the height Z.

Every time the automated driving vehicle 100 passes the same road, the same road surface is repeatedly measured (detected) and the height Z of the same road surface is repeatedly calculated. In this case, an average value or a weighted average value of the heights Z calculated so far is used as the height Z. That is to say, the height Z of the road surface is updated every time the same road surface is measured. In the case of the weighted average value, for example, a weight for the latest height Z is set to be the largest.

The evaluation value indicates "certainty" of the terrain map information MAP_TE. That is, the evaluation value indicates certainty that the road surface is present at the position [X, Y] and the height Z indicated by the terrain map information MAP_TE.

The evaluation information is information used for calculating the evaluation value. The evaluation information includes the number of measurements, variance, and so forth. The number of measurements includes at least one of the number of calculations of the height Z and the number of the road surface points used for calculating the height Z. The variance includes at least one of variance of the calculated heights Z and variance of the heights $ZL_j$ of the road surface points used for calculating the height Z. For example, when the number of measurements is small, the evaluation value is low. As the number of measurements becomes larger, the evaluation value becomes higher. As the variance becomes larger, the evaluation value becomes lower.

Based on the result of recognition by the recognition sensor of the automated driving vehicle 100, the map management device 300 is able to calculate the evaluation value to generate and update the terrain map information MAP_TE. The time stamp indicates a time when the data set is generated or a time when the data set is last updated.

When using the terrain map information MAP_TE, the automated driving vehicle 100 may use only the data set whose evaluation value is equal to or higher than a threshold. In other words, the automated driving vehicle 100 may presume that a road surface is present at a position indicated by the data set whose evaluation value is equal to or higher than the threshold. Accordingly, accuracy of detection of the obstacle OBS is improved.

2. Remote Support System

2-1. Overview

Figure 5:
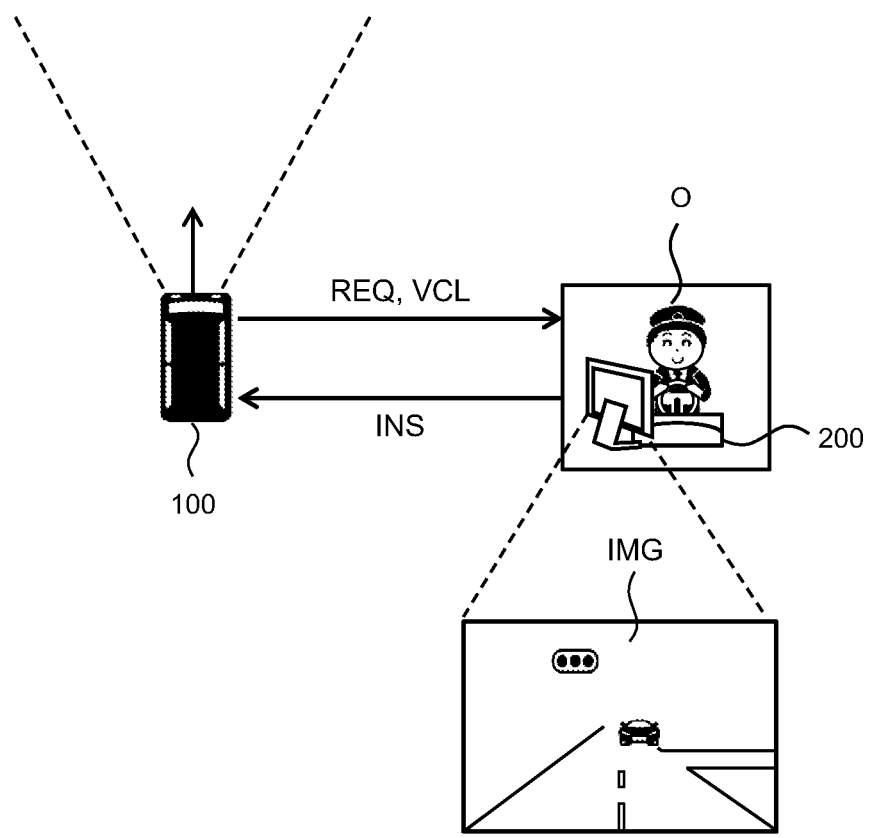
FIG. 5 is a conceptual diagram showing an overview of a remote support system according to an embodiment of the present disclosure.

FIG. 5 is a schematic diagram showing an overview of a remote support system 2 according to the present embodiment. The remote support system 2 includes the automated driving vehicle 100 and a remote operator terminal 200. The remote operator terminal 200 is a terminal device used by a remote operator O for performing remote support for the automated driving vehicle 100. The remote operator terminal 200 may also be referred to as a remote support human machine interface (HMI). The automated driving vehicle 100 and the remote operator terminal 200 can communicate with each other via a communication network.

Typically, a situation in which the remote support by the remote operator O is necessary is a situation in which the automated driving is difficult. When determining that the remote support is necessary, the automated driving vehicle 100 issues a "support request REQ" that requests the remote operator O to give support. That is, the automated driving vehicle 100 transmits the support request REQ to the remote operator terminal 200. The remote operator terminal 200 receives the support request REQ from the automated driving vehicle 100 and notifies the remote operator O of the received support request REQ. In response to the support request REQ, the remote operator O starts the remote support for the automated driving vehicle 100.

Further, the automated driving vehicle 100 transmits vehicle information VCL to the remote operator terminal 200. The vehicle information VCL indicates a state of the automated driving vehicle 100, a surrounding situation, a result of processing by the automated driving vehicle 100, and the like. The remote operator terminal 200 presents the vehicle information VCL received from the automated driving vehicle 100 to the remote operator O. For example, the remote operator terminal 200 displays an image IMG captured by a camera mounted on the automated driving vehicle 100 on a display device.

The remote operator O views the vehicle information VCL to recognize the situation around the automated driving vehicle 100, and performs the remote support for the automated driving vehicle 100. An operator instruction INS, which is input by the remote operator O, is an instruction to the automated driving vehicle 100. The remote operator terminal 200 receives the input of the operator instruction INS from the remote operator O. Then, the remote operator terminal 200 transmits the input operator instruction INS to the automated driving vehicle 100. The automated driving vehicle 100 receives the operator instruction INS from the remote operator terminal 200 and performs the automated driving control in accordance with the received operator instruction INS.

In this manner, the remote support for the automated driving vehicle 100 by the remote operator O is realized.

2-2. Remote Support Related to Obstacle

As described above, the automated driving vehicle 100 is able to detect the obstacle OBS. When the remote operator O's decision about an action with respect to the detected obstacle OBS is necessary, the automated driving vehicle 100 may issue the support request REQ that requests the remote operator O to give support.

For example, the automated driving vehicle 100 decides whether or not it is necessary to stop in front of the detected obstacle OBS. When deciding that it is necessary to stop in front of the detected obstacle OBS, the automated driving vehicle 100 performs the automated driving control so as to stop in front of the obstacle OBS and issues the support request REQ. It should be noted that the support request REQ may be issued after the automated driving vehicle 100 is stopped or may be issued before after it is stopped.

Figure 6:
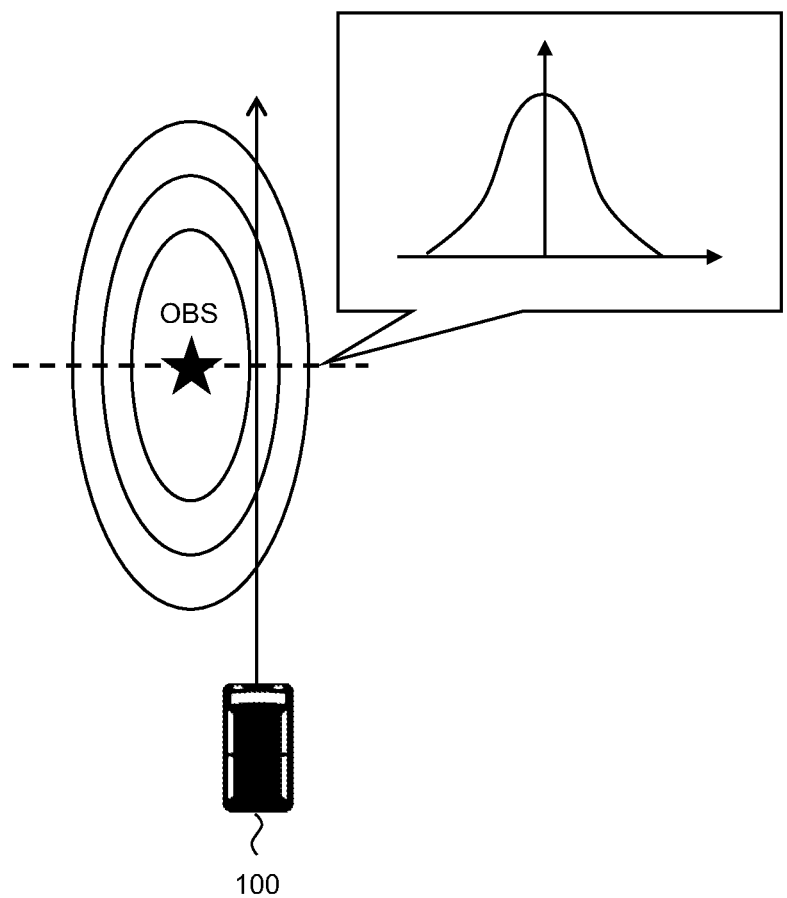
FIG. 6 is a conceptual diagram for explaining an example of a stop decision process performed by an automated driving vehicle according to an embodiment of the present disclosure.

FIG. 6 is a conceptual diagram for explaining an example of the stop decision process performed by the automated driving vehicle 100. When the obstacle OBS is detected, the automated driving vehicle 100 sets a probability distribution representing an existence probability of the obstacle OBS around the detection position of the obstacle OBS. The existence probability of the obstacle OBS is set to be maximum at the detection position of the obstacle OBS and to become lower as away from the detection position of the obstacle OBS. The probability distribution is, for example, a Gaussian distribution. The automated driving vehicle 100 calculates the existence probability of the obstacle OBS when it is assumed that the automated driving vehicle 100 goes straight. Then, when the existence probability of the obstacle OBS exceeds a stop decision threshold, the automated driving vehicle 100 decides that it is necessary to stop. The stop decision threshold is set based on, for example, a variance $\sigma$ of the probability distribution. For example, the stop decision threshold is set to the existence probability at a position of $3\sigma$. In other words, the automated driving vehicle 100 determines whether a lateral distance between the detection position of the obstacle OBS and the vehicle position when going straight is equal to or greater than $3\sigma$. When the lateral distance is less than $3\sigma$, the automated driving vehicle 100 decides that it is necessary to stop.

It can also be said that the automated driving vehicle 100 calculates a stuck risk (a possibility that the vehicle stops at a certain point and cannot start moving) in advance. When the stuck risk is higher than a threshold value, the automated driving vehicle 100 determines that the remote operator O's decision is necessary.

When requiring the remote operator O's decision about an action with respect to the detected obstacle OBS, the automated driving vehicle 100 transmits the vehicle information VCL together with the support request REQ to the remote operator terminal 200. The vehicle information VCL includes the image IMG captured by the camera, information on the detected obstacle OBS, the state of the automated driving vehicle 100, and the like. Based on the vehicle information VCL, the remote operator O recognizes the obstacle OBS and the situation around the automated driving vehicle 100, and inputs an appropriate operator instruction INS. Various types of the operator instruction INS regarding the obstacle OBS are conceivable.

For example, the types of the operator instruction INS include a "criterion relaxation instruction." The criterion relaxation instruction instructs the automated driving vehicle 100 to relax a criterion for deciding whether or not it is necessary to stop in front of the detected obstacle OBS. For example, relaxing the criterion includes temporarily setting the above-described stop decision threshold to be higher than a default value. When the stop decision threshold becomes higher, a probability that the automated driving vehicle 100 decides that it is necessary to stop decreases. It can also be said that the criterion relaxation instruction is an instruction to temporarily reduce a degree of consideration of the detected obstacle OBS. The automated driving vehicle 100 that has received the criterion relaxation instruction performs the stop decision process again in accordance with the relaxed criterion. As a result, the automated driving vehicle 100 may decide that it is not necessary to stop in front of the obstacle OBS. In this case, the automated driving vehicle 100 resumes the automated driving control and passes through the position of the obstacle OBS.

As another example, the types of the operator instruction INS may include an "avoidance instruction." The avoidance instruction instructs the automated driving vehicle 100 to go forward while avoiding the detected obstacle OBS. Avoiding the obstacle OBS includes steering the automated driving vehicle 100 in a direction away from the obstacle OBS.

As still another example, the types of the operator instruction INS may include a "wait instruction." The wait instruction instructs the automated driving vehicle 100 to wait as it is.

3. Map Management System

3-1. Overview

As described above, the automated driving vehicle 100 is able to detect the obstacle OBS around the automated driving vehicle 100 based on the map information MAP. If there is a gap between the map information MAP and an actual situation, accuracy of detection of the obstacle OBS may decrease. For example, an erroneous detection of the obstacle OBS may be caused. The decrease in the accuracy of detection of the obstacle OBS is not preferable from a viewpoint of the automated driving control. It is therefore desired to recognize the gap between the map information MAP and the actual situation and to update the map information MAP.

Figure 7:
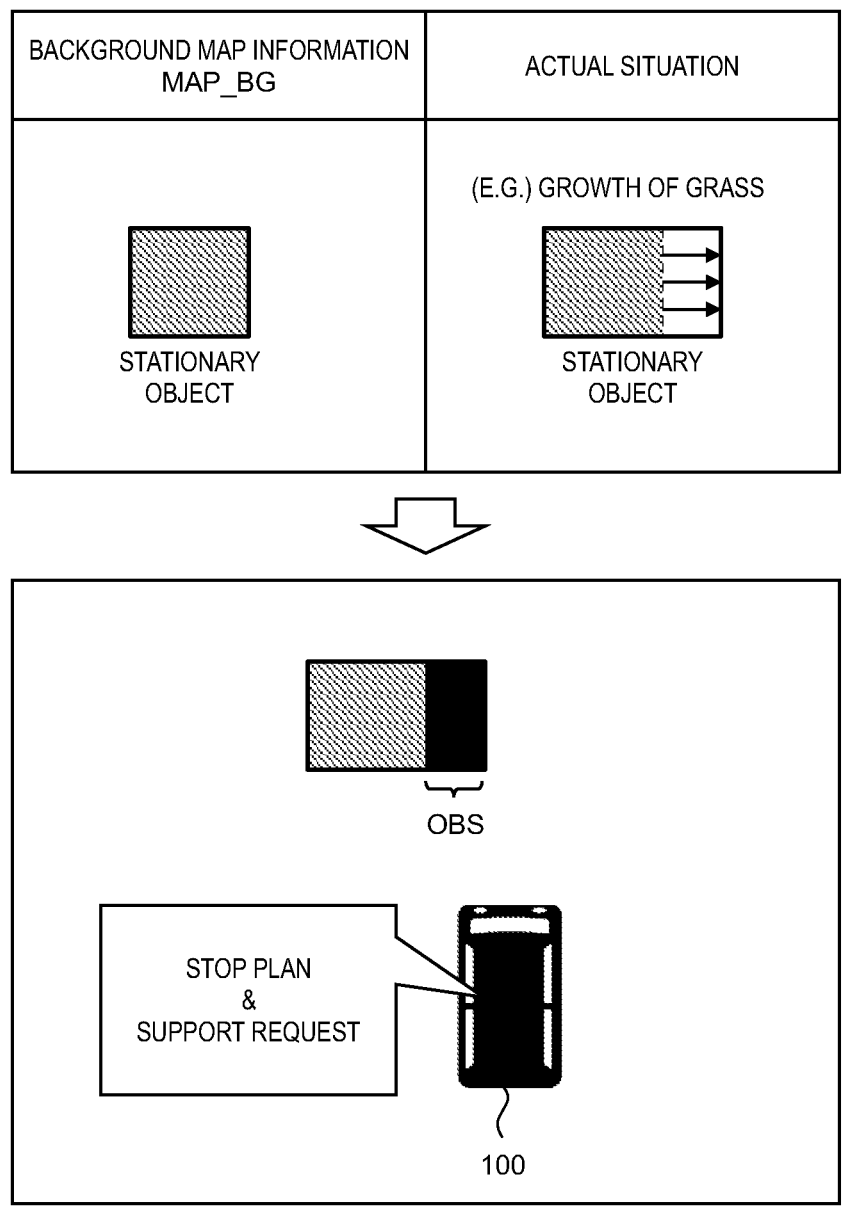
FIG. 7 is a conceptual diagram for explaining an example of a situation in which there is a gap between an actual situation and background map information according to an embodiment of the present disclosure.

FIG. 7 is a conceptual diagram for explaining an example of a situation in which there is a gap between the background map information MAP_BG and the actual situation. An actual stationary object is larger than the stationary object registered in the background map information MAP_BG. For example, such the situation may be caused when roadside grass grows. As another example, such the situation may be caused when a guardrail that is not registered in the background map information MAP_BG is newly installed. A portion that does not overlap with the stationary object indicated by the background map information MAP_BG is detected as an obstacle OBS. When deciding that it is necessary to stop in front of the detected obstacle OBS, the automated driving vehicle 100 performs the automated driving control so as to stop in front of the obstacle OBS and issues the support request REQ.

As described above, when there is a gap between the background map information MAP_BG and the actual situation, not only a "moving object" but also a "stationary object" may be detected as the obstacle OBS. In other words, not only the support request REQ with regard to the "moving object" but also the support request REQ with regard to the "stationary object" may be issued.

The operator instruction INS from the remote operator O is highly likely to vary depending on whether the obstacle OBS is the moving object or the stationary object. For example, when the obstacle OBS is the moving object, the remote operator O is highly likely to issue the wait instruction or the avoidance instruction as the operator instruction INS. On the other hand, when the obstacle OBS is a soft stationary object (e.g, grass, leaves) that is passable, the remote operator O may issue the criterion relaxation instruction as the operator instruction INS. The remote operator O never issues the criterion relaxation instruction at least in a situation where a moving object is present near the automated driving vehicle 100. Conversely, when the criterion relaxation instruction is issued by the remote operator O, the obstacle OBS is highly likely to be a soft stationary object.

Therefore, it is possible to estimate the type of the obstacle OBS detected by the automated driving vehicle 100 based on the operator instruction INS from the remote operator O.

When it is estimated that the obstacle OBS is a "stationary object", information on the detected obstacle OBS is not yet registered in the background map information MAP_BG. In other words, there is a gap between the background map information MAP_BG and the actual situation. Therefore, the background map information MAP_BG is updated so that the information on the detected obstacle OBS is reflected in the background map information MAP_BG. For example, the background map information MAP_BG is updated so that the evaluation value (see FIG. 3) at the detection position of the obstacle OBS increases.

On the other hand, when the obstacle OBS is estimated to be a "moving object", it is not necessary to update the background map information MAP_BG. Alternatively, the background map information MAP_BG may be updated so that the fact that "the obstacle OBS is not a stationary object" is reflected in the background map information MAP_BG. For example, the background map information MAP_BG is updated so that the evaluation value (see FIG. 3) at the detection position of the obstacle OBS decreases.

In this manner, it is possible to update the map information MAP by referring to the operator instruction INS from the remote operator O. A "map management system 3" according to the present embodiment executes such the map update processing.

Figure 8:
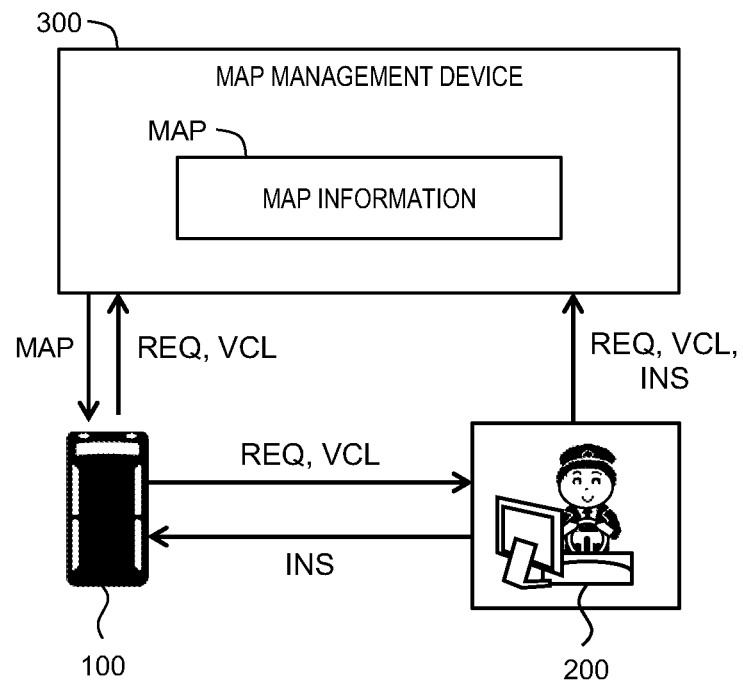
FIG. 8 is a conceptual diagram showing an overview of a map management system according to an embodiment of the present disclosure.

FIG. 8 is a conceptual diagram showing an overview of the map management system 3 according to the present embodiment. The map management system 3 includes the automated driving vehicle 100, the remote operator terminal 200, and the map management device 300. It can also be said that the map management system 3 is a combination of the automated driving management system 1 and the remote support system 2 described above.

The map management system 3 acquires the support request REQ related to the obstacle OBS that is issued by the automated driving vehicle 100. Moreover, the map management system 3 acquires the operator instruction INS to the automated driving vehicle 100 that is issued by the remote operator O in response to the support request REQ. The map management system 3 estimates the type of the obstacle OBS based on a state of acquisition of the operator instruction INS or a content of the operator instruction INS. Various concrete examples of the obstacle type estimation process will be described later. Then, the map management system 3 updates the map information MAP according to the estimated type of the obstacle OBS.

As described above, according to the present embodiment, it is possible to automatically recognize the gap between the map information MAP and the actual situation and to automatically update the map information MAP. Here, the remote operator O does not need to judge or recognize the gap between the map information MAP and the actual situation. The remote operator O just needs to perform the remote support for the automated driving vehicle 100 as usual. The map management system 3 automatically recognizes the gap between the map information MAP and the actual situation based on the operator instruction INS, and automatically updates the map information MAP as necessary. That is, according to the present embodiment, it is possible to efficiently update the map information MAP without increasing a burden on the remote operator O.

3-2. Obstacle Type Estimation Process

The map management system 3 estimates the type of the obstacle OBS based on the operator instruction INS. More specifically, the map management system 3 estimates the type of the obstacle OBS based on a state of acquisition of the operator instruction INS or a content of the operator instruction INS. Hereinafter, various concrete examples of the obstacle type estimation process will be described.

3-2-1. First Example

In a first example, the map management system 3 estimates the type of the obstacle OBS based on the state of acquisition of the criterion relaxation instruction described above.

More specifically, when the support request REQ related to the obstacle OBS is acquired, the map management system 3 monitors a state of detection of the obstacle OBS by the automated driving vehicle 100. It is assumed that the remote operator O then issues the criterion relaxation instruction as the operator instruction INS. When the criterion relaxation instruction is acquired, the map management system 3 determines whether or not the detection of the obstacle OBS by the automated driving vehicle 100 is still continuing at the timing when the criterion relaxation instruction is acquired. For example, the map management system 3 determines whether or not the LIDAR point cloud still exists at the detection position of the obstacle OBS.

When the criterion relaxation instruction is issued despite continued detection of the obstacle OBS, the obstacle OBS is highly likely to be a soft stationary object that is passable. Therefore, the map management system 3 estimates the detected obstacle OBS to be a "stationary object." Hereinafter, such the passable stationary object may be referred to as a "first type stationary object." Examples of the first type stationary object include grass and leaves.

On the other hand, when the criterion relaxation instruction is issued after the detection of the obstacle OBS is terminated, it is considered that the obstacle OBS has moved and a risk of collision has disappeared. Therefore, the map management system 3 estimates the detected obstacle OBS to be a "moving object." That is, the map management system 3 estimates the detected obstacle OBS not to be a stationary object.

3-2-2. Second Example

Also in a second example, the map management system 3 estimates the type of the obstacle OBS based on the state of acquisition of the criterion relaxation instruction described above.

More specifically, when the support request REQ related to the obstacle OBS is acquired, the map management system 3 measures an elapsed time from the issuance of the support request REQ to acquisition of the operator instruction INS. It is assumed that the remote operator O then issues the criterion relaxation instruction as the operator instruction INS. When the criterion relaxation instruction is acquired, the map management system 3 compares the elapsed time from the issuance of the support request REQ to the acquisition of the criterion relaxation instruction with a predetermined threshold.

When the elapsed time from the issuance of the support request REQ to the acquisition of the criterion relaxation instruction is less than the predetermined threshold, it is considered that the remote operator O has judged that the risk is low and has immediately issued the criterion relaxation instruction. That is, the obstacle OBS is highly likely to be the first type stationary object that is passable. Therefore, the map management system 3 estimates the detected obstacle OBS to be a "stationary object."

On the other hand, when the elapsed time from the issuance of the support request REQ to the acquisition of the criterion relaxation instruction is equal to or greater than the predetermined threshold, it is considered that the remote operator O has waited until the moving object moves and the risk disappears. Therefore, the map management system 3 estimates the detected obstacle OBS to be a "moving object." That is, the map management system 3 estimates the detected obstacle OBS not to be a stationary object.

3-2-3. Third Example

In a third example, the map management system 3 estimates the type of the obstacle OBS based on the content of the operator instruction INS. In particular, the map management system 3 estimates whether or not the obstacle OBS is a stationary object based on whether or not the operator instruction INS is the criterion relaxation instruction.

More specifically, when the criterion relaxation instruction is acquired as the operator instruction INS, the map management system 3 estimates the detected obstacle OBS to be a "stationary object." On the other hand, when the above-described wait instruction is acquired as the operator instruction INS, the detected obstacle OBS is estimated to be a "moving object."

3-2-4. Fourth Example

In a fourth example, the map management system 3 estimates the type of the obstacle OBS based on the state of acquisition of the avoidance instruction described above. The avoidance instruction instructs the automated driving vehicle 100 to go forward while avoiding the detected obstacle OBS.

Figure 9:
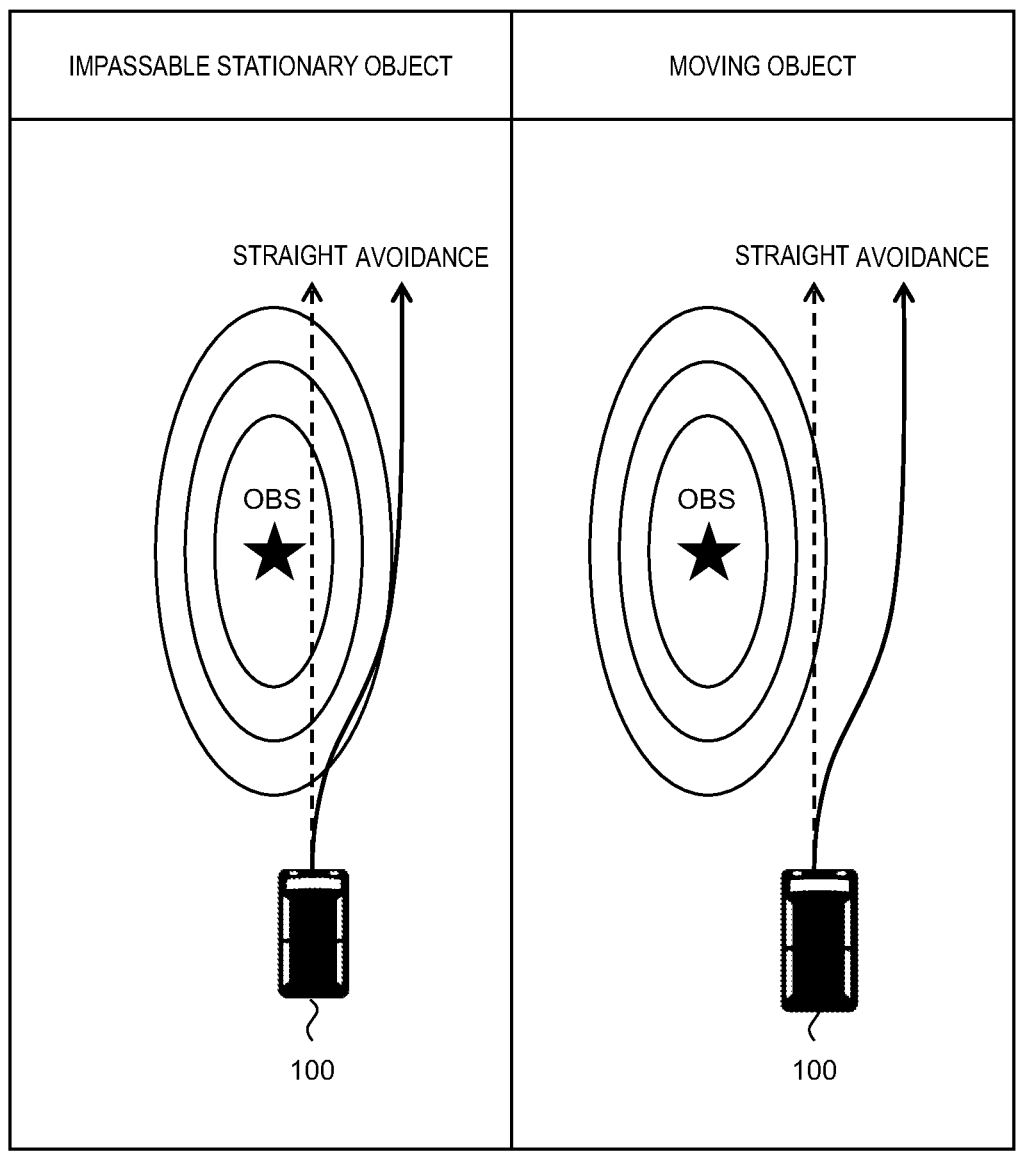
FIG. 9 is a conceptual diagram showing an example of an obstacle type estimation process according to an embodiment of the present disclosure.

FIG. 9 is a conceptual diagram for explaining the fourth example. As described above, the automated driving vehicle 100 sets the probability distribution representing the existence probability of the obstacle OBS around the detection position of the obstacle OBS. The map management system 3 acquires information on the probability distribution set by the automated driving vehicle 100. It is assumed that the remote operator O then issues the avoidance instruction as the operator instruction INS. When the avoidance instruction is acquired, the map management system 3 acquires information on the existence probability of the obstacle OBS when it is assumed that the automated driving vehicle 100 goes straight.

When the existence probability of the obstacle OBS when going straight exceeds a predetermined probability threshold, the obstacle OBS is highly likely to be a stationary object that is impassable. Therefore, the map management system 3 estimates the detected obstacle OBS to be a "stationary object." Hereinafter, such the impassable stationary object may be referred to as a "second type stationary object." Examples of the second type stationary object include a guardrail and a wall.

On the other hand, when the existence probability of the obstacle OBS when going straight is equal to or less than the predetermined probability threshold, it means that the avoidance instruction is issued although a possibility of collision is extremely low. This suggests that the remote operator O sufficiently takes movement of a moving object into consideration and thus intends to secure a sufficient margin. Therefore, the map management system 3 estimates the detected obstacle OBS to be a "moving object." That is, the map management system 3 estimates the detected obstacle OBS not to be a stationary object.

3-2-5. Fifth Example

In a fifth example, a plurality of instruction buttons selectable by the remote operator O are installed in the remote operator terminal 200. For example, the plurality of instruction buttons include "the criterion relaxation instruction with respect to the first type stationary object", "the avoidance instruction with respect to the second type stationary object", "the wait instruction with respect to the moving object", and the like. The remote operator O selects an appropriate instruction button. The remote operator terminal 200 outputs the operator instruction INS indicating the content of the instruction button selected by the remote operator O. The map management system 3 is able to estimate the type of the obstacle OBS based on the content of the operator instruction INS.

3-3. Functional Configuration Example and Processing Flow

Figure 10:
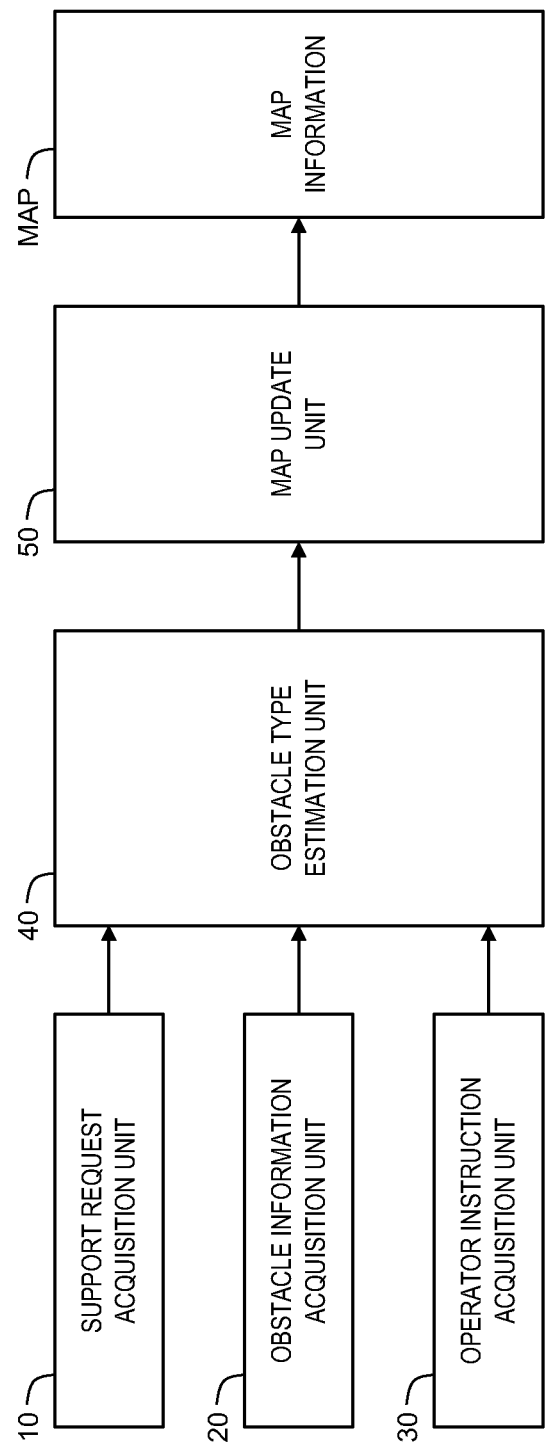
FIG. 10 is a block diagram showing a functional configuration example of a map management system according to an embodiment of the present disclosure.

FIG. 10 is a block diagram showing a functional configuration example of the map management system 3 according to the present embodiment. The map management system 3 includes, as functional blocks, a support request acquisition unit 10, an obstacle information acquisition unit 20, an operator instruction acquisition unit 30, an obstacle type estimation unit 40, and a map update unit 50. These functional blocks are realized by one or more processors included in the map management system 3.

Figure 11:
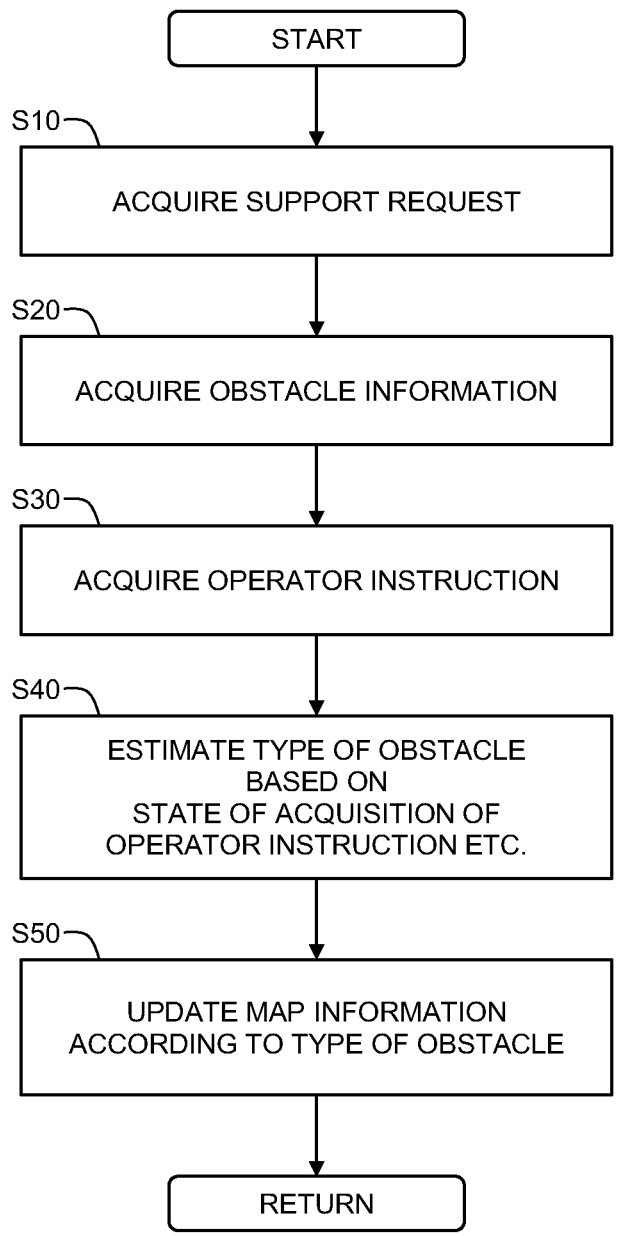
FIG. 11 is a flowchart showing a map update process according to an embodiment of the present disclosure.

FIG. 11 is a flowchart showing the map update process by the map management system 3 according to the present embodiment.

In Step S10, the support request acquisition unit 10 acquires the support request REQ related to the obstacle OBS detected by the automated driving vehicle 100. Although the source of the support request REQ is the automated driving vehicle 100, the support request acquisition unit 10 may be included in any of the automated driving vehicle 100, the remote operator terminal 200, and the map management device 300.

In Step S20, the obstacle information acquisition unit 20 acquires information on the obstacle OBS detected by the automated driving vehicle 100. In the first example described above, the information on the obstacle OBS includes the state of detection of the obstacle OBS by the automated driving vehicle 100. In the fourth example described above, the information on the obstacle OBS includes the probability distribution of the obstacle OBS set by the automated driving vehicle 100. Although the source of the information on the obstacle OBS is the automated driving vehicle 100, the obstacle information acquisition unit 20 may be included in any of the automated driving vehicle 100, the remote operator terminal 200, and the map management device 300.

In Step S30, the operator instruction acquisition unit 30 acquires the operator instruction INS to the automated driving vehicle 100 issued by the remote operator O in response to the support request REQ. Although the source of the operator instruction INS is the remote operator terminal 200, the operator instruction acquisition unit 30 may be included in any of the automated driving vehicle 100, the remote operator terminal 200, and the map management device 300.

In Step S40, the obstacle type estimation unit 40 executes the obstacle type estimation process described in Section 3-2 above. The obstacle type estimation unit 40 estimates the type of the obstacle OBS based on the state of acquisition of the operator instruction INS or the content of the operator instruction INS. If necessary, the obstacle type estimation unit 40 uses the information on the obstacle OBS as well. The obstacle type estimation unit 40 may consider the timing of issuance of the support request REQ. The obstacle type estimation unit 40 may be included in any of the automated driving vehicle 100, the remote operator terminal 200, and the map management device 300 as long as the information necessary for processing can be acquired.

In Step S50, the map update unit 50 updates the map information MAP according to the type of the obstacle OBS estimated by the obstacle type estimation unit 40. For example, in the case where the map information MAP is the background map information MAP_BG, the processing is performed as follows.

When the obstacle OBS is estimated to be a stationary object, the information on the detected obstacle OBS is not yet registered in the background map information MAP_BG. In other words, there is a gap between the background map information MAP_BG and the actual situation. Therefore, the background map information MAP_BG is updated so that the information on the detected obstacle OBS is reflected in the background map information MAP_BG. For example, the background map information MAP_BG is updated so that the evaluation value (see FIG. 3) at the detection position of the obstacle OBS increases.

On the other hand, when the obstacle OBS is estimated to be a moving object, it is not necessary to update the background map information MAP_BG. Alternatively, the background map information MAP_BG may be updated so that the fact that "the obstacle OBS is not a stationary object" is reflected in the background map information MAP_BG. For example, the background map information MAP_BG is updated so that the evaluation value (see FIG. 3) at the detection position of the obstacle OBS decreases.

For example, the map update unit 50 is included in the map management device 300. In this case, the map management device 300 acquires the information on the type of the obstacle OBS from the obstacle type estimation unit 40, and updates the map information MAP. The map management device 300 may be installed in the automated driving vehicle 100. As another example, the map update unit 50 may be included in the automated driving vehicle 100 or the remote operator terminal 200. In this case, the map update unit 50 acquires the information on the type of the obstacle OBS from the obstacle type estimation unit 40, determines a content of update of the map information MAP, and notifies the map management device 300 of the content of update of the map information MAP. The map management device 300 updates the map information MAP according to the notified content of update.

3-4. Effects

As described above, according to the present embodiment, the map information MAP used by the automated driving vehicle 100 is updated with reference to the content of the remote support related to the obstacle OBS detected by the automated driving vehicle 100. The operator instruction INS from the remote operator O is likely to vary depending on the type of the obstacle OBS. Therefore, the type of the obstacle OBS detected by the automated driving vehicle 100 can be estimated based on the operator instruction INS from the remote operator O. Then, the map information MAP is updated according to the estimated type of the obstacle OBS.

The remote operator O does not need to judge or recognize the gap between the map information MAP and the actual situation. The remote operator O just needs to perform the remote support for the automated driving vehicle 100 as usual. The map management system 3 automatically recognizes the gap between the map information MAP and the actual situation based on the operator instruction INS, and automatically updates the map information MAP as necessary. That is, according to the present embodiment, it is possible to efficiently update the map information MAP without increasing the burden on the remote operator O.

4. Other Examples of Map Information

The map information MAP used by the automated driving vehicle 100 is not limited to the background map information MAP_BG. The map information MAP may include the terrain map information MAP_TE (see FIG. 4). Also in this case, the map update process similar to that described above can be applied.

Figure 12:
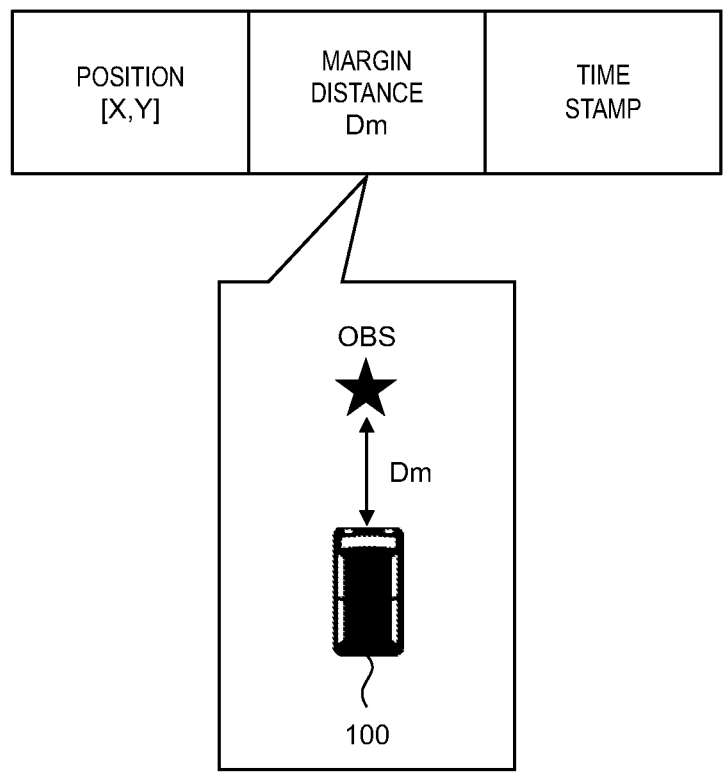
FIG. 12 is a conceptual diagram for explaining an example of stop margin map information according to an embodiment of the present disclosure.

The map information MAP may include stop margin map information MAP_MG as shown in FIG. 12. When the automated driving vehicle 100 needs to stop in front of the obstacle OBS, the automated driving stops in front of the obstacle OBS while securing a certain margin distance Dm. The reason is that if the avoidance instruction is issued from the remote operator O, a certain amount of space is required for an avoidance action (turning) for avoiding the obstacle OBS. The stop margin map information MAP_MG is map information indicating such the margin distance Dm for each position.

When the obstacle OBS is detected, the automated driving vehicle 100 acquires the margin distances Dm associated with the detection position of the obstacle OBS from the stop margin map information MAP_MG. Then, the automated driving vehicle 100 stops in front of the obstacle OBS so as to secure the margin Dm.

Figure 13:
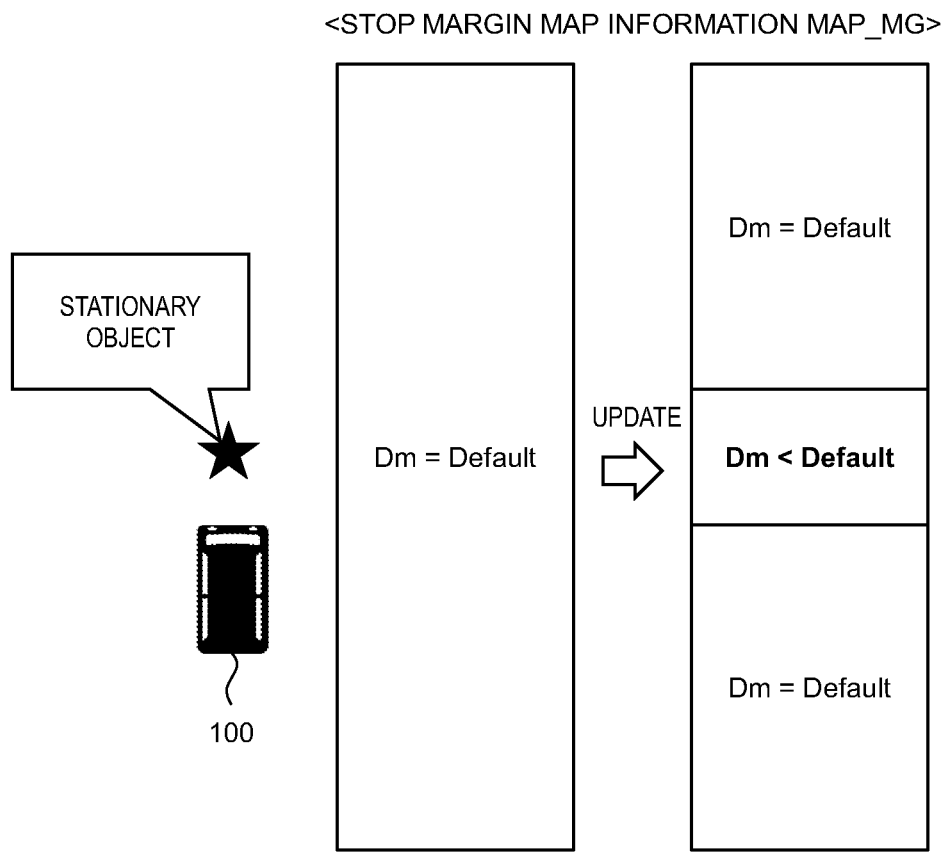
FIG. 13 is a conceptual diagram showing an example of update of stop margin map information according to an embodiment of the present disclosure.

FIG. 13 is a conceptual diagram for explaining an example of update of the stop margin map information MAP_MG. In an initial setting, the margin distance Dm is a default value. In the case where the obstacle OBS is the stationary object, it is allowable that the margin distance Dm is smaller than that in the case of the moving object. In particular, in the case where the obstacle OBS is the first type stationary object that is passable, the avoidance action is not necessary and thus it is allowable that the margin distance Dm is small. Therefore, when the detected obstacle OBS is estimated to be the stationary object, the map management system 3 (the map update unit 50) updates the stop margin map information MAP_MG such that the margin distance Dm at the detection position of the obstacle OBS (i.e., the stationary object) becomes smaller than the default value.

Decreasing the margin distance Dm at a relatively safe position as described above enables more efficient automated driving control.

5. Example of Automated Driving Vehicle

5-1. Configuration Example

Figure 14:
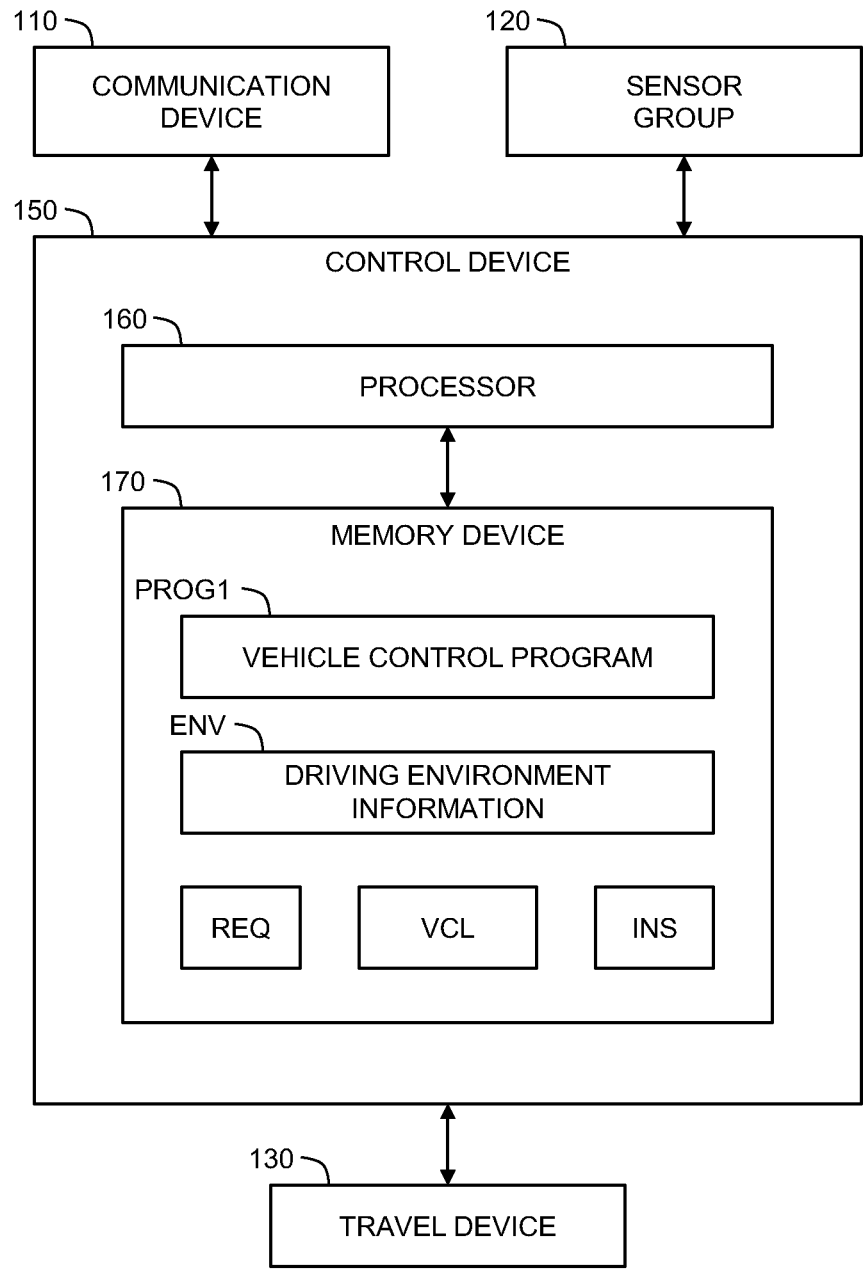
FIG. 14 is a block diagram showing a configuration example of an automated driving vehicle according to an embodiment of the present disclosure.

FIG. 14 is a block diagram showing a configuration example of the automated driving vehicle 100. The automated driving vehicle 100 includes a communication device 110, a sensor group 120, a travel device 130, and a control device (controller) 150.

The communication device 110 communicates with the outside of the automated driving vehicle 100. For example, the communication device 110 communicates with the remote operator terminal 200 and the map management device 300.

The sensor group 120 includes a recognition sensor, a vehicle state sensor, a position sensor, and the like. The recognition sensor recognizes (detects) a situation around the automated driving vehicle 100. Examples of the recognition sensor include a camera, a LIDAR, a radar, and the like. The vehicle state sensor detects a state of the automated driving vehicle 100. Examples of the vehicle state sensor include a speed sensor, an acceleration sensor, a yaw rate sensor, a steering angle sensor, and the like. The position sensor detects a position and an orientation of the automated driving vehicle 100. For example, the position sensor includes a GNSS (Global Navigation Satellite System).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the automated driving vehicle 100. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a CPU (Central Processing Unit). The memory device 170 stores a variety of information necessary for the processing by the processor 160. Examples of the memory device 170 include a volatile memory, a non-volatile memory, an HDD (Hard Disk Drive), an SSD (Solid State Drive), and the like. The control device 150 may include one or more ECUs (Electronic Control Units).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

5-2. Driving Environment Information

The control device 150 acquires driving environment information ENV indicating a driving environment for the automated driving vehicle 100. The driving environment information ENV is stored in the memory device 170.

The driving environment information ENV includes the map information MAP. The control device 150 communicates with the map management device 300 via the communication device 110 to acquire necessary map information MAP.

Moreover, the driving environment information ENV includes surrounding situation information indicating a result of recognition by the recognition sensor. For example, the surrounding situation information includes the image IMG captured by the camera. The surrounding situation information may include object information regarding an object around the automated driving vehicle 100. Examples of the object around the automated driving vehicle 100 include a pedestrian, another vehicle (e.g., a preceding vehicle, a parked vehicle, etc.), a white line, a traffic signal, a sign, a roadside structure, and the like. The object information indicates a relative position and a relative velocity of the object with respect to the automated driving vehicle 100.

Furthermore, the driving environment information ENV includes vehicle state information indicating the vehicle state detected by the vehicle state sensor.

Furthermore, the driving environment information ENV includes vehicle position information indicating the position and the orientation of the automated driving vehicle 100. The vehicle position information is acquired by the position sensor. Highly accurate vehicle position information may be acquired by performing a well-known localization using map information and the surrounding situation information (the object information).

5-3. Vehicle Control

The control device 150 executes vehicle travel control that controls travel of the automated driving vehicle 100. The vehicle travel control includes steering control, driving control, and braking control. The control device 150 executes the vehicle travel control by controlling the travel device 130 (i.e., the steering device, the driving device, and the braking device).

In addition, the control device 150 executes automated driving control based on the driving environment information ENV. More specifically, the control device 150 generates a travel plan of the automated driving vehicle 100 based on the driving environment information ENV. Further, the control device 150 generates, based on the driving environment information ENV, a target trajectory required for the automated driving vehicle 100 to travel in accordance with the travel plan. The target trajectory includes a target position and a target speed. Then, the control device 150 executes the vehicle travel control such that the automated driving vehicle 100 follows the target trajectory.

Further, the control device 150 determines whether the automated driving control is difficult based on the driving environment information ENV. When facing a scene in which the automated driving control is difficult, the control device 150 transmits the support request REQ and the vehicle information VCL to the remote operator terminal 200 via the communication device 110. The vehicle information VCL is information necessary for the remote support by the remote operator O, and includes at least a part of the driving environment information ENV described above. For example, the vehicle information VCL includes the surrounding situation information (in particular, the image IMG and the information on the obstacle OBS). The vehicle information VCL may further include the vehicle state information, the vehicle position information, the travel plan, and the like. Thereafter, the control device 150 receives the operator instruction INS from the remote operator terminal 200 via the communication device 110. The control device 150 executes the vehicle travel control in accordance with the received operator instruction INS.

Figure 15:
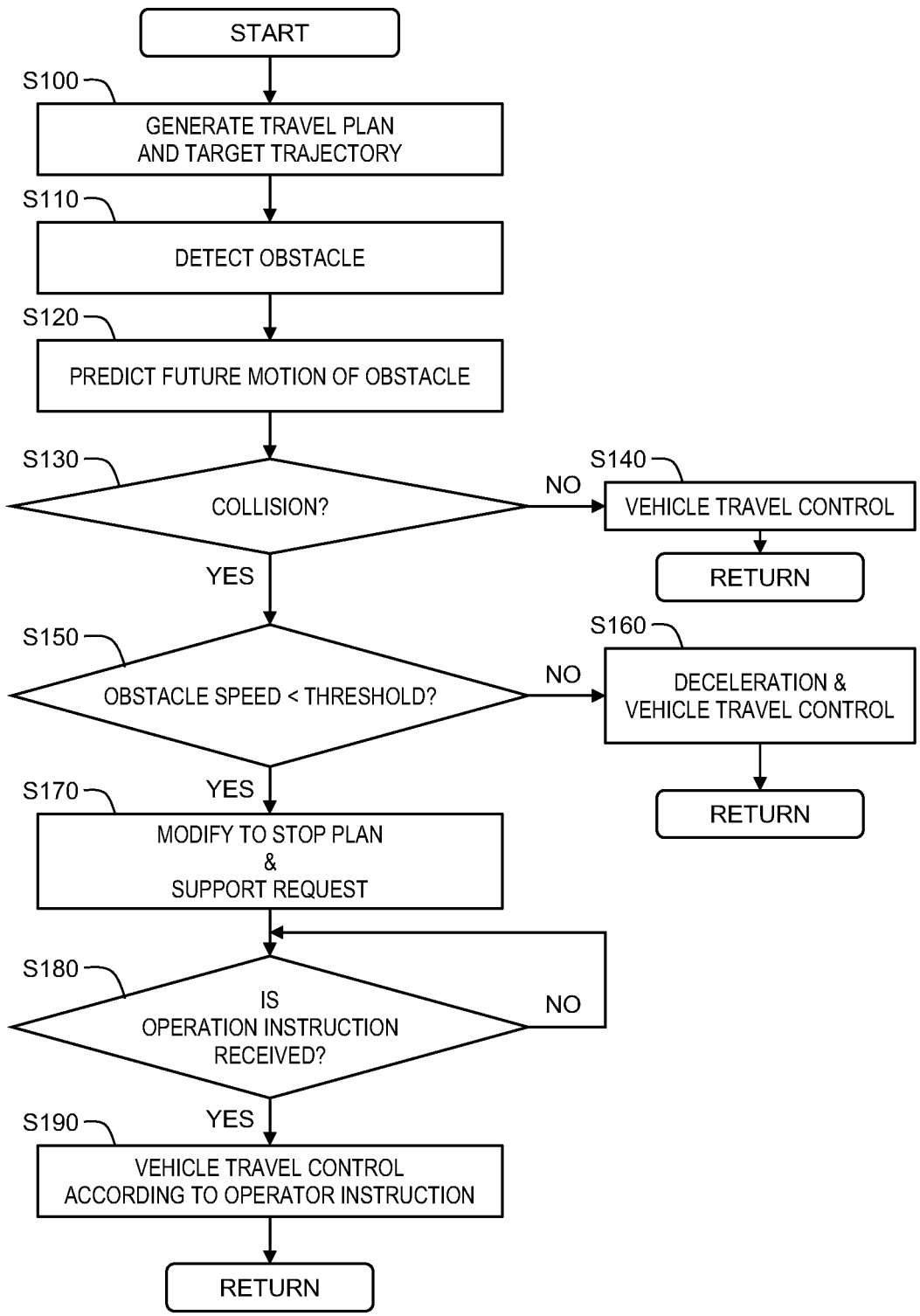
FIG. 15 is a flowchart showing an example of processing performed by the automated driving vehicle according to an embodiment of the present disclosure.

FIG. 15 is a flowchart showing an example of processing performed by the automated driving vehicle 100.

In Step S100, the control device 150 generates the travel plan and the target trajectory based on the driving environment information ENV.

In Step S110, the control device 150 detects the obstacle OBS around the automated driving vehicle 100 based on the surrounding situation information and the map information MAP. A position and a speed of the detected obstacle OBS is calculated based on the surrounding situation information.

In Step S120, the control device 150 predicts a future motion of the obstacle OBS based on a history of the position and the speed of the obstacle OBS. The future motion includes a future position and the like.

In Step S130, the control device 150 determines a possibility of a collision between the automated driving vehicle 100 and the obstacle OBS. For example, the control device 150 determines the possibility of the collision by comparing the target trajectory of the automated driving vehicle 100 with the future motion of the obstacle OBS. When the collision possibility is lower than a threshold value (Step S130; No), the processing proceeds to Step S140. On the other hand, when the collision possibility is higher than the threshold value (Step S130; Yes), the processing proceeds to Step S150.

In Step S140, the control device 150 maintains the current travel plan and the current target trajectory.

In Step S150, the control device 150 determines whether or not the speed of the obstacle OBS is less than a speed threshold. When the speed of the obstacle OBS is equal to or higher than the speed threshold (Step S150; No), the processing proceeds to Step S160. On the other hand, when the speed of the obstacle OBS is lower than the speed threshold (Step S150; Yes), the processing proceeds to Step S170.

In Step S160, the control device 150 modifies the travel plan to one that performs the deceleration so as not to cause the collision. Then, the control device 150 performs the vehicle travel control in accordance with the modified travel plan.

In Step S170, the control device 150 decides that it is necessary to stop in front of the obstacle OBS. The control device 150 modifies the travel plan to one that stops in front of the obstacle OBS, and makes the automated driving vehicle 100 stop. In conjunction with that, the control device 150 transmits the support request REQ related to the obstacle OBS to the remote operator terminal 200 via the communication device 110. Further, the control device 150 transmits the vehicle information VCL to the remote operator terminal 200 via the communication device 110.

In Step S180, the control device 150 determines whether or not the operator instruction INS is received from the remote operator station 200. When the operator instruction INS is received (Step S180; Yes), the processing proceeds to Step S190.

In Step S190, the control device 150 performs the vehicle travel control in accordance with the received operator instruction INS.

5-4. Map Update Process

The control device 150 may take charge of at least a part of the map update process performed by the map management system 3 described above. The control device 150 has at least the functions of the support request acquisition unit 10, the obstacle information acquisition unit 20, and the operator instruction acquisition unit 30. The control device 150 may have the function of the obstacle type estimation unit 40. The control device 150 may have the function of the map update unit 50.

6. Example of Remote Operator Terminal

Figure 16:
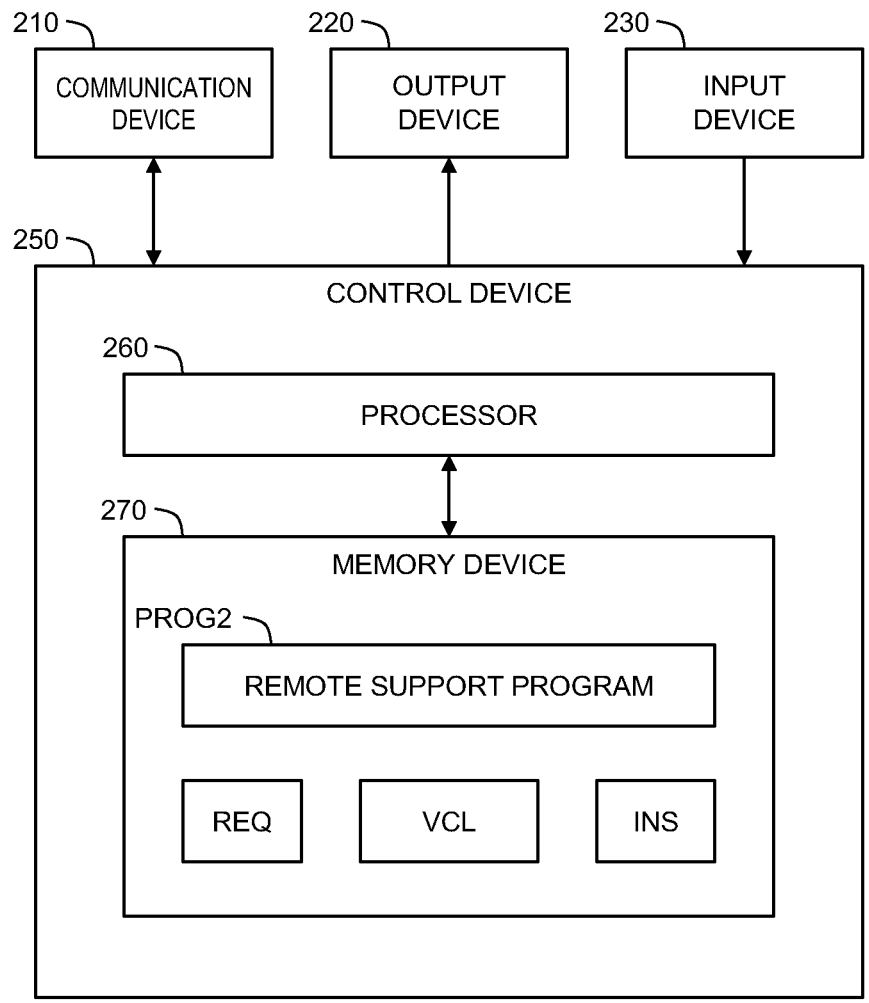
FIG. 16 is a block diagram showing a configuration example of a remote operator terminal according to an embodiment of the present disclosure.

FIG. 16 is a block diagram showing a configuration example of the remote operator terminal 200. The remote operator station 200 includes a communication device 210, an output device 220, an input device 230, and a control device (controller) 250.

The communication device 210 communicates with the automated driving vehicle 100 and the map management device 300.

The output device 220 outputs a variety of information. For example, the output device 220 includes a display device. The display device presents a variety of information to the remote operator O by displaying the variety of information. As another example, the output device 220 may include a speaker.

The input device 230 accepts input from the remote operator O. Examples of the input device 230 include a touch panel, a keyboard, a mouse, a button, and the like. The remote operator O is able to input the operator instruction INS by the use of the input device 230.

The control device 250 controls the remote operator terminal 200. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote support program PROG2 is a computer program executed by the processor 260. The functions of the control device 250 are implemented by the processor 260 executing the remote support program PROG2. The remote support program PROG2 is stored in the memory device 270. The remote support program PROG2 may be recorded on a non-transitory computer-readable recording medium. The remote support program PROG2 may be provided via a network.

The control device 250 receives, via the communication device 210, the support request REQ and the vehicle information VCL that are transmitted from the automated driving vehicle 100. The control device 250 presents the vehicle information VCL to the remote operator O by displaying the vehicle information VCL on the display device. The remote operator O is able to recognize the state and the surrounding situation of the automated driving vehicle 100 based on the vehicle information VCL. The remote operator O uses the input device 230 to input the operator instruction INS. The control device 250 transmits the input operator instruction INS to the automated driving vehicle 100 via the communication device 210.

The control device 250 may take charge of at least a part of the map update process performed by the map management system 3 described above. The control device 250 has at least the functions of the support request acquisition unit 10, the obstacle information acquisition unit 20, and the operator instruction acquisition unit 30. The control device 250 may have the function of the obstacle type estimation unit 40. The control device 250 may have the function of the map update unit 50.

7. Example of Map Management Device

Figure 17:
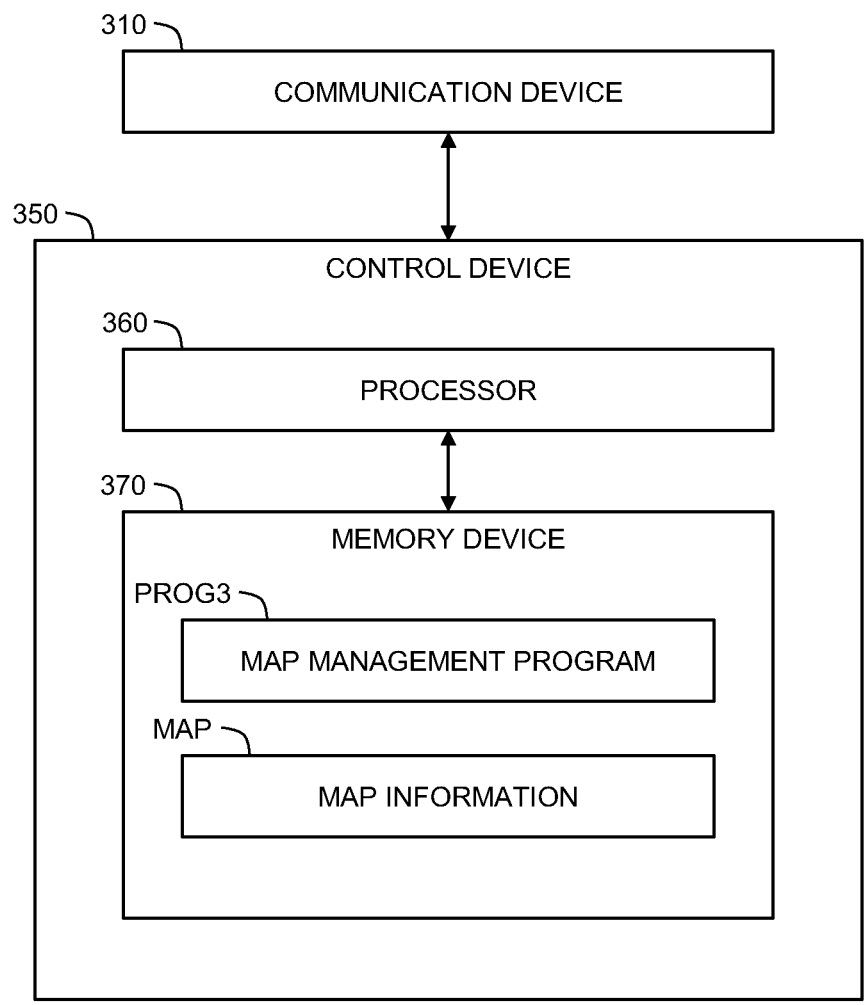
FIG. 17 is a block diagram showing a configuration example of a map management device according to an embodiment of the present disclosure.

FIG. 17 is a block diagram showing a configuration example of the map management device 300. The map management device 300 includes a communication device 310 and a control device (controller) 350.

The communication device 310 communicates with the automated driving vehicle 100 and the remote operator terminal 200.

The control device 350 controls the map management device 300. The control device 350 includes one or more processors 360 (hereinafter simply referred to as a processor 360) and one or more memory devices 370 (hereinafter simply referred to as a memory device 370). The processor 360 executes a variety of processing. For example, the processor 360 includes a CPU. The memory device 370 stores a variety of information necessary for the processing by the processor 360. Examples of the memory device 370 include a volatile memory, a non-volatile memory, an HDD, an SSD, and the like.

A map management program PROG3 is a computer program executed by the processor 360. The functions of the control device 350 are implemented by the processor 360 executing the map management program PROG3. The map management program PROG3 is stored in the memory device 370. The map management program PROG3 may be recorded on a non-transitory computer-readable recording medium. The map management program PROG3 may be provided via a network.

The memory device 370 stores the map information MAP. The map information MAP is used by the automated driving vehicle 100.

The control device 350 manages the map information MAP. For example, the control device 350 distributes the map information MAP to each automated driving vehicle 100 via the communication device 310.

The control device 350 takes charge of at least a part of the map update process performed by the map management system 3 described above. The control device 350 has at least the function of the map update unit 50. The control device 350 may have the functions of the support request acquisition unit 10, the obstacle information acquisition unit 20, the operator instruction acquisition unit 30, and the obstacle type estimation unit 40.

What is claimed is:

1. A map management system comprising:
one or more processors; and
one or more memory devices configured to store map information used by an automated driving vehicle, wherein
the automated driving vehicle detects an obstacle based on the map information, or acquires a margin distance when stopping in front of an obstacle based on the map information,
when requiring a remote operator's decision about an action with respect to the obstacle, the automated driving vehicle issues a support request that requests the remote operator to give support, and
the one or more processors are configured to:
acquire an operator instruction to the automated driving vehicle issued by the remote operator in response to the support request;
estimate a type of the obstacle based on a state of acquisition of the operator instruction or a content of the operator instruction;
update the map information according to the type of the obstacle; and
control the automated driving vehicle based on the updated map information,
wherein the map information indicates a position of a stationary object or terrain,
wherein the operator instruction comprises a criterion relaxation instruction that instructs the automated driving vehicle to relax a criterion for deciding whether or not to stop in front of the obstacle and a wait instruction that instructs the automated driving vehicle to wait, and
wherein the one or more processors are further configured to:
estimate the obstacle to be the stationary object when acquiring the criterion relaxation instruction as the operator instruction;
estimate the obstacle not to be the stationary object when acquiring the wait instruction as the operator instruction.

2. The map management system according to claim 1, wherein
the automated driving vehicle detects the obstacle based on a comparison between the map information and a result of recognition by a recognition sensor, and
the one or more processors are further configured to:
when the obstacle is estimated to be the stationary object, update the map information such that the obstacle is reflected in the map information.

3. The map management system according to claim 2, wherein
the one or more processors are further configured to, when the obstacle is estimated not to be the stationary object, prohibit the map information from being updated or update the map information such that a fact that the obstacle is not the stationary object is reflected in the map information.

4. The map management system according to claim 2, wherein
the automated driving vehicle sets a probability distribution representing an existence probability of the obstacle around a detection position of the obstacle,
types of the operator instruction include an avoidance instruction that instructs the automated driving vehicle to go forward while avoiding the obstacle, and
the one or more processors are further configured to:
when acquiring the avoidance instruction as the operator instruction, acquire information on the existence probability of the obstacle when it is assumed that the automated driving vehicle goes straight;
estimate the obstacle to be the stationary object when the existence probability exceeds a probability threshold; and
estimate the obstacle not to be the stationary object when the existence probability is equal to or less than the probability threshold.

5. The map management system according to claim 1, wherein
the one or more processors are further configured to:
estimate the obstacle to be the stationary object when acquiring the criterion relaxation instruction as the operator instruction despite continued detection of the obstacle; and
estimate the obstacle not to be the stationary object when acquiring the criterion relaxation instruction as the operator instruction after detection of the obstacle is terminated.

6. The map management system according to claim 1, wherein
the one or more processors are further configured to:
estimate the obstacle to be the stationary object when an elapsed time from issuance of the support request to acquisition of the criterion relaxation instruction is less than a threshold; and
estimate the obstacle not to be the stationary object when the elapsed time exceeds the threshold.

7. The map management system according to claim 1, wherein
the map information indicates the margin distance when the automated driving vehicle stops in front of the obstacle,
the automated driving vehicle acquires the margin distance from the map information and stops in front of the obstacle so as to secure the margin distance, and
the one or more processors are further configured to:
estimate whether the obstacle is a stationary object or not based on the content of the operator instruction; and
when the obstacle is estimated to be the stationary object, update the map information such that the margin distance at a position of the obstacle decreases.

8. The map management system according to claim 7, wherein
types of the operator instruction include a criterion relaxation instruction that instructs the automated driving vehicle to relax a criterion for deciding whether or not to stop in front of the obstacle, and the one or more processors are further configured to estimate the obstacle to be the stationary object when acquiring the criterion relaxation instruction as the operator instruction.

9. A map management method for managing map information used by an automated driving vehicle, wherein
the automated driving vehicle detects an obstacle based on the map information, or acquires a margin distance when stopping in front of an obstacle based on the map information,
when requiring a remote operator's decision about an action with respect to the obstacle, the automated driving vehicle issues a support request that requests the remote operator to give support,
the map management method comprising:
acquiring an operator instruction to the automated driving vehicle issued by the remote operator in response to the support request;
estimating a type of the obstacle based on a state of acquisition of the operator instruction or a content of the operator instruction;
updating the map information according to the type of the obstacle; and
controlling the automated driving vehicle based on the updated map information
wherein the map information indicates a position of a stationary object or terrain,
wherein the operator instruction comprises a criterion relaxation instruction that instructs the automated driving vehicle to relax a criterion for deciding whether or not to stop in front of the obstacle and a wait instruction that instructs the automated driving vehicle to wait, and
wherein the estimating the type of obstacle comprises:
estimating the obstacle to be the stationary object when acquiring the criterion relaxation instruction as the operator instruction;
estimating the obstacle not to be the stationary object when acquiring the wait instruction as the operator instruction.

* * * * *